United States Patent
Lo

(10) Patent No.: US 8,275,960 B2
(45) Date of Patent: Sep. 25, 2012

(54) METHOD FOR PROTECTING DATA IN THE HARD DISK

(75) Inventor: Sheng-Hsin Lo, Taipei County (TW)

(73) Assignee: Inventec Corporation, Taipei (TW)

( * ) Notice: Subject to any disclaimer, the term of this patent is extended or adjusted under 35 U.S.C. 154(b) by 665 days.

(21) Appl. No.: 12/021,896

(22) Filed: Jan. 29, 2008

(65) Prior Publication Data

US 2009/0193209 A1 Jul. 30, 2009

(51) Int. Cl.
*G06F 12/14* (2006.01)

(52) U.S. Cl. . 711/163; 711/114; 711/164; 711/E12.091; 726/26; 726/27; 713/189

(58) Field of Classification Search .................. 711/114, 711/163–164, E12.091; 713/189; 726/21, 726/26–27
See application file for complete search history.

(56) References Cited

U.S. PATENT DOCUMENTS

| 2001/0044896 | A1* | 11/2001 | Schwartz et al. | 713/169 |
| 2006/0085348 | A1* | 4/2006 | Alda et al. | 705/52 |
| 2007/0136818 | A1* | 6/2007 | Blumberg et al. | 726/27 |
| 2009/0158439 | A1* | 6/2009 | Lee et al. | 726/26 |

* cited by examiner

*Primary Examiner* — Jasmine Song
(74) *Attorney, Agent, or Firm* — J.C. Patents

(57) ABSTRACT

A method for protecting data in the hard disk is provided. The method is suitable for a computer system and includes the following steps. First, a plurality of specification parameters conforming to the computer system is read. Next, a part of the specification parameters are encoded for obtaining a recognition byte. Then, when the computer system writes data to a hard disk, a specific operation is performed to a byte read or written by the hard disk and the recognition byte for maintaining a security of the data in the hard disk.

5 Claims, 2 Drawing Sheets

METHOD FOR PROTECTING DATA IN THE HARD DISK

BACKGROUND OF THE INVENTION

1. Field of the Invention

The present invention relates to a method for protecting data in the hard disk. More particularly, the present invention relates to a method for protecting data in the hard disk, without inputting of password strings.

2. Description of Related Art

With development of technologies, computer system has become an indispensable tool for processing information. The computer system may satisfy requirements of people in aspects of work, travelling and entertainment. For example, data such as personal financial details, financial account passwords, private documents and pictures, personal letters, commercial documents and intelligent creations may all be processed in the computer system or stored in a hard disk of the computer system.

However, with rapid improvement of computer crime skills and increasing of crime events, once the computer is stolen or invaded by hackers, personal privacies and classified information may be leaked. Therefore, for a business people or a personal computer user, how to avoid money and credit lost or law liability due to loss of computer or illegal access of data stored in the computer is an urgent demand.

To avoid the aforementioned problems, various methods for protecting data in the hard disk are provided. The conventional methods for protecting data in the hard disk generally set a hard disk password in a basic input output system (BIOS) of the computer system. Then, when the computer system is turned on, a password string is required to be input. If the password string input by the user does not match a predetermined hard disk password, the hard disk of the computer system is then locked, so as to maintain a security of the data stored in the hard disk.

Though the conventional method may protect the data stored in the hard disk via hard disk password, it is not applicable. In some cases, for example, if the user forgets the predetermined hard disk password, the hard disk of the computer system may be permanently lock and cannot use again. Moreover, every time the computer system is turned on, the user has to input the password string, and therefore this method is not efficient and convenient.

SUMMARY OF THE INVENTION

The present invention is directed to a method for protecting data in the hard disk, by which a specific operation is performed on a recognition byte obtained by encoding specification parameters and a byte read and written by the hard disk, so as to prevent the data in the hard disk from illegal access.

The present invention provides a method for protecting data in the hard disk, by which data written to the hard disk are encoded with specification parameters, so as to maintain a security of the data in the hard disk.

The present invention provides a method for protecting data in the hard disk. The method is suitable for a computer system and includes the following steps. First, a plurality of specification parameters conforming to the computer system is read. Next, a part of the specification parameters are encoded for obtaining a recognition byte. Then, when the computer system writes data to or reads data from a hard disk, a specific operation is performed to a byte read or written by the hard disk and the recognition byte for maintaining a security of the data in the hard disk.

In an embodiment of the present invention, the specification parameters include manufacturer description, product number, model number and serial number of the computer system. Moreover, the specific operation is an XOR operation.

The present invention provides another method for protecting data in the hard disk. The method is suitable for a computer system and includes the following steps. First, a plurality of specification parameters conforming to the computer system is read. Next, an unprotected byte is encoded with the specification parameters, so as to write a protected byte obtained into the hard disk. Correspondingly, when the computer system reads the protected byte from the hard disk, the protected byte and the specification parameters are decoded, so as to obtain the original unprotected byte.

According to the present invention, the specific operation or encoding is performed to the data written to the hard disk, such that illegal access of the data in the hard disk may be avoided. Moreover, compared to the conventional technique, the method of the present invention may protect the data in the hard disk without inputting of password string. Therefore, the method of the present invention may maintain the security of the data in the hard disk, and is applicable and continent.

In order to make the aforementioned and other objects, features and advantages of the present invention comprehensible, a preferred embodiment accompanied with figures is described in detail below.

DESCRIPTION OF EMBODIMENTS

Figure 1:
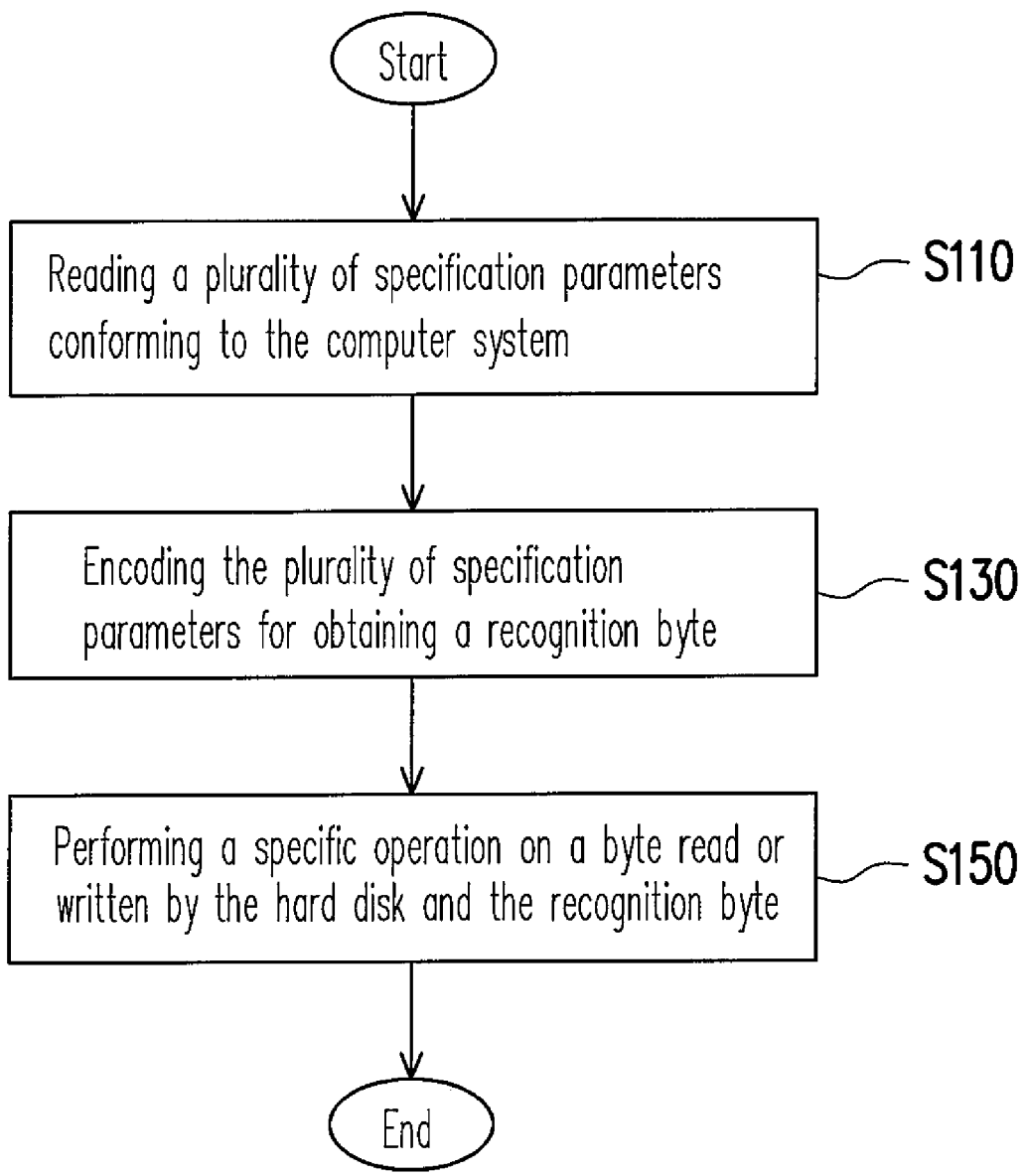
FIG. 1 is a flowchart illustrating a method for protecting data in the hard disk according to an embodiment of the present invention.

FIG. 1 is a flowchart illustrating a method for protecting data in the hard disk according to an embodiment of the present invention. The method is suitable for a computer system and includes the following steps.

Referring to FIG. 1, first, in step S110, a plurality of specification parameters conforming to the computer system is read. For example, when fabrication of the computer system is completed, the related specification parameters such as manufacturer description, product number, model number and serial number are stored to the computer system. Therefore, the plurality of specification parameters are originally stored in the computer system, and in the step S110, these specification parameters are read.

Next, in step S130, a part of the specification parameters are selected and encoded for obtaining a recognition byte. In other words, in the step S130, a part of the specification parameters are encoded for obtaining the recognition byte.

Next, in step S150, when the computer system writes data to or reads data from the hard disk, a specific operation is performed to a byte read and written by the hard disk and the recognition byte for maintaining a security of the data in the hard disk.

For example, when the computer system is about to write an unprotected byte to the hard disk, the specific operation is performed to the unprotected byte and the recognition byte, so as to generate a protected byte. Then, the protected byte is stored into the hard disk. Correspondingly, when the computer system reads the protected byte from the hard disk, the specific operation is performed to the protected byte and the specification parameters for obtaining the original unprotected data. Next, the unprotected data is transmitted for being utilized within internal circuit of the computer system.

It should be noted that conversions between the unprotected byte and the protected byte are all achieved by performing the specific operation with the recognition byte, and therefore the specific operation of the present embodiment may be an XOR operation. Though a possible algorithm is assigned to the specific operation of the present invention, those skilled in the art should be understood that design of the specific operation may be varied according to an actual requirement of different manufacturers, and therefore design of the specific operation is not limited by the present invention.

Moreover, compared to the conventional technique, the method of the present invention may protect the data in the hard disk without inputting of password string. Meanwhile, a problem of lock of the hard disk due to forgetting of the hard disk password may be avoided. Therefore, the method of the present invention may maintain the security of the data in the hard disk, and is applicable and continent.

Figure 2:
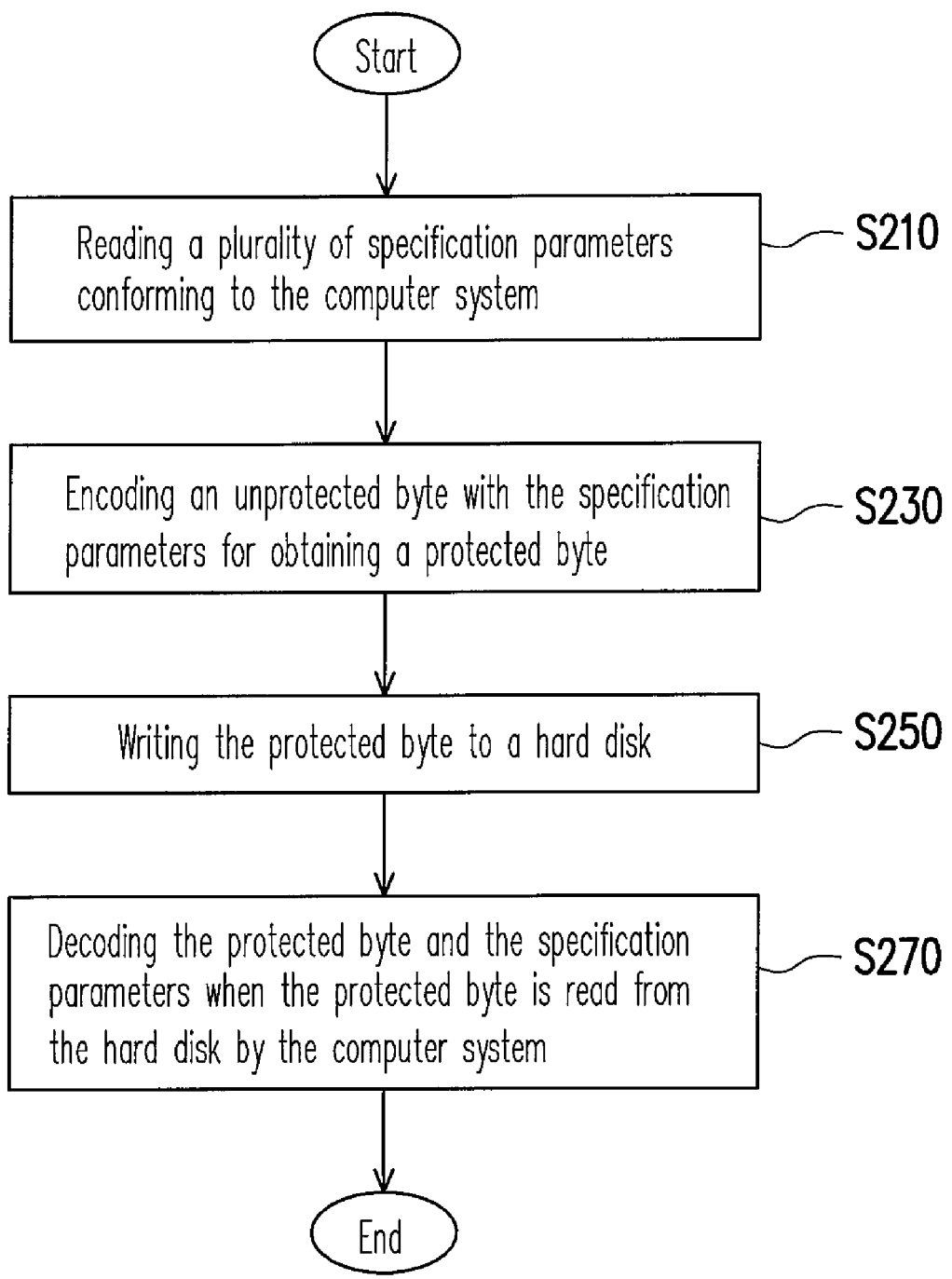
FIG. 2 is a flowchart illustrating a method for protecting data in the hard disk according to another embodiment of the present invention.

FIG. 2 is a flowchart illustrating a method for protecting data in the hard disk according to another embodiment of the present invention. The method is suitable for a computer system and includes the following steps.

Referring to FIG. 2, first, in step S210, a plurality of specification parameters conforming to the computer system is read. Wherein, the specification parameters include manufacturer description, product number, model number and serial number of the computer system. Next, to protect the data within the hard disk, in step S230 and S250, an unprotected byte to be written to the hard disk and the specification parameters are encoded, so as to write an obtained protected byte into the hard disk.

Correspondingly, in step S270, when the computer system reads the protected byte from the hard disk, the protected byte and the specification parameters are decoded, so as to obtain the original unprotected byte. By such means, the data written into the hard disk is first processed by encoding, and therefore if the computer is stolen or is invaded by hackers, the data stored within the hard disk cannot be accessed, such that data leakage may be avoided.

In summary, by performing the specific operation to the recognition byte obtained by encoding the specification parameters and the byte read and written by the hard disk, or by encoding the data written to the hard disk with the specification parameters, illegal access of the data within the hard disk may be avoided. Therefore, the method of the present invention may protect the data in the hard disk without inputting of password string.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for protecting data in the hard disk, suitable for a computer device, the method for protecting data in the hard disk comprising:
   reading a plurality of specification parameters conforming to and originally stored in the computer device;
   encoding a part of the specification parameters for obtaining a first recognition byte in the computer device;
   when an unprotected byte is written to the hard disk by the computer device, performing a specific operation to the unprotected byte and the first recognition byte so as to generate a protected byte, and storing the protected byte to the hard disk;
   when the protected byte is read from the hard disk by the computer device, performing the specific operation to the protected byte and the first recognition byte, wherein the protected byte is decoded to the unprotected byte and a second recognition byte;
   determining whether the second recognition byte is the same as the first recognition byte;
   when the second recognition byte is the same as the first recognition, obtaining the unprotected byte and transmitting the unprotected byte; and
   when the second recognition byte is not the same as the first recognition, stopping reading.

2. The method for protecting data in the hard disk as claimed in claim 1, wherein the specific operation is an XOR operation.

3. The method for protecting data in the hard disk as claimed in claim 1, wherein the specification parameters comprise manufacturer description, product number, model number and serial number of the computer device.

4. A method for protecting data in the hard disk, suitable for a computer system, the method for protecting data in the hard disk comprising:
   reading a plurality of first specification parameters conforming to and original stored in the computer system;
   when an unprotected data is written to the hard disk by the computer system, encoding the unprotected byte with the first specification parameters for obtaining a protected byte;
   writing the protected byte to the hard disk;
   when the protected byte is read from the hard disk by the computer system, decoding the protected byte and the specification parameters to obtain a plurality of second specification parameters and the unprotected byte;
   determining whether the first specification parameters are the same as the second specification parameters;
   when the first specification parameters are the same as the second specification parameters, obtaining the unprotected byte and transmitting the unprotected byte; and
   when the first specification parameters are not the same as the second specification parameters, stopping reading.

5. The method for protecting data in the hard disk as claimed in claim 4, wherein the specification parameters comprise manufacturer description, product number, model number and serial number of the computer system.

* * * * *